United States Patent [19]

Ueno et al.

[11] 4,339,483

[45] Jul. 13, 1982

[54] WELDED CAN WITH AN ORGANIC, METALLIC, ORGANIC LAYER ADJACENT THE WELD

[75] Inventors: Hiroshi Ueno, Yokosuka; Shunji Kojima, Yokohama; Kazuo Taira, Tokyo; Tadahiko Katsura, Yokohama; Makoto Horiguchi, Fujisawa; Susumu Takahashi, Yamato, all of Japan

[73] Assignee: Toyo Seikan Kaisha Limited, Tokyo, Japan

[21] Appl. No.: 165,006

[22] Filed: Jul. 1, 1980

[30] Foreign Application Priority Data

Jul. 4, 1979 [JP] Japan .................................. 54/83916

[51] Int. Cl.$^3$ ........................ B65D 7/12; B65D 25/14
[52] U.S. Cl. ...................................... 428/35; 428/38; 428/458; 220/75; 220/458; 220/450; 426/126; 426/131
[58] Field of Search .................. 428/458, 35; 138/171; 220/76, 75, 450, 458, 456, DIG. 29; 426/126, 131

[56] References Cited

U.S. PATENT DOCUMENTS

| | | | |
|---|---|---|---|
| 2,797,843 | 7/1957 | Orlins | 220/75 |
| 3,502,243 | 3/1970 | Erlandson et al. | 220/75 |
| 3,888,224 | 6/1975 | Okuhara et al. | 220/450 |
| 3,949,896 | 4/1976 | Luc | 220/75 |

FOREIGN PATENT DOCUMENTS

| | | | |
|---|---|---|---|
| 47-31787 | 11/1972 | Japan . | |
| 54-138039 | 10/1979 | Japan | 428/458 |

*Primary Examiner*—Richard L. Schilling
*Assistant Examiner*—John L. Goodrow
*Attorney, Agent, or Firm*—Wenderoth, Lind & Ponack

[57] ABSTRACT

In a welded metallic can wherein the can body is covered at its joint portion with a film of an organic polymeric resin, the improvement wherein said film is characterized by being a multilayered film having at least one layer of a film of an organic polymeric resin and at least one layer selected from the group consisting of metallic foils, evaporation coated metallic layers and electroplated metallic layers, and further characterized in that the layer disposed adjacent the welded can is the film of an organic polymeric resin.

3 Claims, No Drawings

WELDED CAN WITH AN ORGANIC, METALLIC, ORGANIC LAYER ADJACENT THE WELD

This invention relates to improvements in the coating of the welded portion of a can with a film of an organic polymeric resin.

Since the metal-to-metal joining of the joints of a welded can is performed at elevated temperatures with the application of pressure, exposure of the iron surface takes place in the case of say a tin can as a result of the tin layer becoming detached. Also, in the case of the welded cans that are made of electrolytically chromated sheet steel [tin-free steel (TFS)], there are instances in which the chromium or chromium oxide layer at the portion to be joined is removed by a mechanical operation prior to the welding operation. The iron surface is thus in an exposed state in this case.

Furthermore, there are also instances in which the iron at the severed ends of the sheet iron stock is exposed or the iron that melts during the welding accumulates in the neighborhood of the welded portion to expose the iron.

When a can body having joints of this kind is packed with contents that are moist and are preserved for a prolonged period of time, there arises the problem of corrosion of the portion where iron is exposed. This corrosion, depending upon the class of the contents, will become the cause of serious defects such as the can becoming perforated, and swelling of the can by hydrogen, as well as greatly impairing the flavor of the contents.

Hence, it becomes necessary for maintaining the performance of the can to cover the foregoing joints with some type of material. In the case of especially those cans that are used for foodstuffs or aerosol cans in which a long shelf life is required or in which the period of use of the contents extends over a prolonged period of time, the joints must be covered with a material possessing a high anticorrosive performance to ensure that the serious defects such as mentioned hereinabove do not take place during their storage period.

The usual practice heretofore was to cover the joints of the metallic welded cans with a thermosetting type of coating material. It is however difficult to achieve a complete covering by this method. Moreover, even if it were possible to achieve the covering, it still would not be possible to fully prevent the corrosion from taking place. Especially, when a thermosetting resin is used, the coating must be of considerable thickness for achieving a satisfactory anticorrosiveness. Hence, with this increase in thickness of the coating there occurs a marked decline in the processability of such operations as the flanging, seaming, beading and necking-in operations, as well as such defects as corrosion and leakage that accompany cracks in the coating.

A method of covering the joints of the foregoing can with a thermoplastic resin film has also been tried. While it was possible to completely cover the joint portion by this method, it still was not possible to fully prevent corrosion from taking place. A satisfactory anticorrosive coating that can especially stand retorting at 118° C. for about 90 minutes has not yet been made available.

It is therefore an object of this invention to provide an organic polymeric resin film that completely covers the joint portion of a welded can and not only provides satisfactory anticorrosiveness over a prolonged period of time but also can stand a retort treatment at elevated temperatures.

Our researches with the view of achieving the above object led to the discovery that for obtaining a fully satisfactory anticorrosiveness by covering the welded joint portion with a film the film, must be a multilayered film, at least one of which layers is a metallic layer. The invention was thus perfected.

This invention is thus directed to a welded can wherein, in a can body whose welded portion is covered with an organic polymeric resin, the film used for covering the welded portion is characterized by being a multilayered film having at least one layer of either a metallic foil or a vacuum evaporation coated or plated metallic layer.

The film that covers the joint portion of a welded can of this invention is a multilayered film having at least one layer of an organic polymeric resin film and at least one layer of a metallic foil or a vacuum evaporation coated or plated metallic layer, of which the layer adjacent the welded can is the organic polymeric resin film.

As examples of the metallic layer of the foregoing laminated film, included are the metallic foils such as aluminum foil, tin foil, stainless steel foil, steel foil chemically treated with chromic acid or phosphoric acid, zinc-plated steel foil, electrically chromated steel foil, and copper foil; and the aluminum, tin, chromium, copper, zinc, titanium and nickel films obtained by the vacuum evaporation coating method and such evaporation depositing techniques as sputtering and ion plating methods, or by the plating technique.

Examples of the organic polymeric resins that can be used in the laminated film of the present invention are, in the case of the thermoplastic resins, the polyesters such as polyethylene terephthalate (PET), polybutylene terephthalate (PBT), and the copolymer of the aforesaid PBT and polybutylene isophthalate; the aliphatic polyamides such as nylon 6, nylon 6—6, nylon 6-10, nylon 11 and nylon 12; the aromatic polyamides such as poly-p-xylylene; the polyvinylidene chlorides and polyvinyl chlorides that are copolymers of predominantly vinylidene chloride with vinyl chloride, vinyl acetate, acrylonitrile, (methacrylates, acrylates, acrylic esters, unsaturated ethers and styrene; the polyolefins such as polypropylene, high density polyethylene, and maleic acid-modified polypropylene; the ethylene-vinyl alcohol copolymers that are obtained by saponification of a copolymer of vinyl acetate and ethylene; the polymethacrylates such as polymethyl methacrylate; the vinyl polymers such as polyvinyl acetate and polystyrene; the polycarbonates; the fluorine-containing polymers such as vinylidene fluoride; the ionomers containing zinc or sodium; the aromatic heterocyclic polymers such as the polyimides; and the diene type polymers such as the polyether styrene-butadiene copolymer. On the other hand, examples of the thermosetting resins which can be used are the phenol-formaldehyde resins, furan-formaldehyde resins, xylene-formaldehyde resins, ketone-formaldehyde resins, urea-formaldehyde resins, melamine-formaldehyde resins, alkyd resins, unsaturated polyester resins, epoxy resins, bismaleimide resins, triallyl cyanurate resins, thermosetting acrylic resins, silicone resins and oil resins.

The foregoing resins are used either singly or in combinations of two or more thereof. In the case of the thermosetting resins, it is especially recommended in most instances that they be used in combinations of two or more classes.

The adhesiveness of the film to the joint portion of the welded can is also an important consideration in the case of the multilayered film of the present invention. Hence, it is preferred to use an organic polymeric resin having superior adhesiveness to the joint portion of the welded can as the layer in contact with the welded can, i.e., as the adhesive layer.

The several layers of the multilayered film of the invention may be laminated in any desired order so long as the adhesive layer is disposed such as to be in contact with the joint portion of the can. For example, a unit assembly consisting of a combination of a single layer of a resinous film and a single layer of a metallic foil, or a combination of a single layer of a resinous film and a metallic film coated thereon by either the evaporation coating or electroplating technique, may be used singly, or several units may be laminated to which is overlaid any number of the resinous layers in any order.

The laminated film of this invention can be made by laminating several layers of films by any of the known methods of lamination, and each of the layers may be films that have been obtained by any of the known film-making techniques. The resinous films, and especially the films of thermoplastic resins, can be submitted to such treatments as biaxially drawing or cold rolling, or such surface treatments as corona treatment or exposure to ultraviolet or X-rays, so long as the performances of the films are not impaired.

The lamination of the resinous film and the metallic layer can be conveniently performed by a method of forming a film of the metallic layer on one or both sides of the resinous film by the aforementioned evaporation coating or electroplating technique, or by a method consisting of adhering a metallic foil to the film with an adhesive such as of the isocyanate type. When a metallic film has been evaporation coated or electroplated to both sides of a resinous film, such a film is used in covering the joint portion of the welded can by interposing another resinous layer between the laminated film and the can.

The lamination of a resinous film with another resinous film can be carried out by such techniques as coating, multilayer coextrusion, extrusion lamination and heat-fusion, or by adhesion with an adhesive of the isocyanate type.

The resinous film laminate having a metallic layer obtained in this manner can be fuse-adhered to the joint portion of a welded can that has been heated by means of direct flame, a heating oven, a hot air oven, induction heating, resistance heating or infrared ray heating, by using a rubber roll, stainless steel roll or Teflon roll. In this case, the adhesion to the joint portion can be enhanced by making a temporary adhesion by the above method and thereafter performing the fuse-adhesion at a still higher temperature. Further, the adhesion between the joint portion of the can and the composite film can be enhanced by quenching the joint portion by directly applying cold water or cold air such as of liquefied nitrogen to the joint portion or by pressing against the joint portion a pressing member that has been cooled by the circulation of a coolant therethrough.

It is also possible to laminate at least one of the layers of the laminated film onto the joint portion of the welded can. This method can be carried out conveniently in those cases where the layer of resin is formed by coating a solution or dispersion of the resin, especially a solution or dispersion of a thermosetting resin.

The overall thickness of the film ranges from 10 $\mu$m to 150 $\mu$m, and preferably from 20 $\mu$m to 80 $\mu$m, of which the thickness of the metallic film ranges from 0.05 to 100 $\mu$m, preferably 0.1 to 40 $\mu$m, and the thickness of the resinous film is at least 7 $\mu$m, and preferably 10 to 80 $\mu$m.

The organic polymeric resin composition from which the several layers of the laminated film of the invention are formed can be incorporated with such additives as antioxidants, thermal stabilizers, ultraviolet absorbents, viscosity controlling agents, plasticizers, nucleating agents, inorganic finely divided particles, organic lubricants, pigments, etc., in an amount not exceeding 20% by weight of the overall resinous composition so long as there is no marked impairment of the performance of the film.

The welded can body of this invention can be made of such metallic materials as tinplate, tin-free steel (electrolytically chromated sheet steel), black plate (untreated sheet steel), sheet aluminum, sheet steel chemically treated with chromic acid or phosphoric acid, and zinc-plated sheet steel.

As compared with a welded can whose joint portion has been covered with the conventional resinous film of a single layer, there was noted in the case of a welded can whose joint portion has been covered with the laminated film of this invention a marked improvement in preventing the corrosion of the joint portion.

That is, since the laminated film of this invention has the property of excluding oxygen, steam and hydrogen sulfide, which become the cause of corrosion of the joint portion of a welded can, there was no formation of corrosion at the joint portion even in the case where, for example, contents of high corrosiveness were packed in the foregoing can and, after retorting at 118° C. for 90 minutes, stored for a period close to one year.

The following examples will serve to more specifically illustrate the present invention. Unless otherwise specified, the composition ratios, percentages and parts used in the examples are on a weight basis.

The tests that were employed in the examples and comparative examples were conducted in the following manner.

1. Manufacture of can

The TFS can body was manufactured in the following manner.

A blank measuring 206.5 mm × 104.5 mm was made using a 0.23-mm-thick tin-free steel (electrolytically chromated sheet steel) by margin coating (leaving uncoated portions) the portion to become the joint of the can with an epoxy-phenol type of coating material at that side to become the inner surface, followed by baking the coating, and likewise by margin coating the side to become the outer surface and impressing this side with a print. Next, the electrolytically chromated covering layer of the blank at its shorter side edges was scraped off at both the inner and outer surfaces to a width of about one millimeter to expose the iron surface completely. This blank was then formed into a cylinder with a roll former such that the shorter sides would be axially disposed. This was followed by superposing and securing the shorter side edges at the welding station, after which the welding of the superposed portion of the shaped body was carried out at a speed of 30 meters per minute while applying a pressure (45 kg) to the superposed portion by means of a roll electrode through the intermediary of a linear electrode, thereby obtaining a welded can body (211 diameter, No. 7 can). The width of the superposed portion subsequent to the welding operation was about 0.4 mm.

On the other hand, the tin can body was manufactured in the following manner.

A blank measuring 206.5 mm×104.5 mm was made using a 0.23-mm-thick electrolytic tinplate with 25 lb/BB of tin plating (thickness of tin layer about 0.6 μm) by margin coating the portion to become the joint of the can with an epoxy-phenol type of coating material at that side to become the inner surface, followed by baking the coating, and likewise by margin coating the side to become the outer surface and impressing this side with a print. This blank was formed into a cylinder with a roll former such that the shorter sides would be axially disposed, after which the shorter side edges were superposed and secured at the welding station and then welded as in the case with the TFS can body at a speed of 30 meters per minute while applying a pressure (45 kg) to the superposed portion of the shaped body by means of a roll electrode through the intermediary of a linear electrode, thereby obtaining a welded can body (211 diameter, No. 7 can). The width of the superposed portion subsequent to the welding operation was about 0.4 mm.

2. Packing and sterilization

The welded can bodies whose joint portion was covered with the test specimens were flanged, doublel-seamed at the bottom lid, and after packing the can with the contents double-seamed at the top lid. When the content was a 50% apple beverage, a beverage heated to 95° C. was packed and, after seaming the top lid, was submitted to the preservation test without further treatment. When the contents were those other than the apple beverage, the can was vacuum seamed after packing the contents and further sterilized by heating at 120° C. for 120 minutes before submitting it to the preservation test. The can used for the test were those of 211 diameter whose contents measured 318.2 ml. The can body made of tinplate was provided with a lid of tinplate whose inner surface was coated with an epoxy-phenol type coating material. On the other hand, the can body made of TFS was provided with a lid of TFS whose inner surface was coated with an epoxy-phenol type coating material.

3. Leakage, evolution of hydrogen and elution of iron

The can goods being tested were all kept stored at 37° C. Three weeks after the start of the test, the leakage was checked by tapping the cans, and those whose sound was unsatisfactory were measured for their degree of vacuum with a vacuum tester. Those whose degree of vacuum had declined were designated as leaking cans. The leakage rate was shown by means of the ratio of leaking cans to the total number of cans tested (about 100 cans). The amount of hydrogen evolved was obtained in the following manner. After storing the cans for one year, the gas contained in the can was collected at the time of its opening and tested for the amount of hydrogen by gas chromatography, and the arithmetical average of ten cans was designated as the amount of hydrogen evolved. On the other hand, the amount of iron eluted was obtained in the following manner. After converting all of the contents of the can to ash after opening it, the ash was again dissolved with hydrochloric acid, and the supernatant liquid was analyzed by atomic absorptiometry to obtain the iron content in the contents. An arithmetical average of ten cans was calculated and designated as the amount of iron eluted.

4. Perforations and corrosion

The canned goods were stored for one year at 37° C., after which leakage of the contents (liquid) was examined visually. In the case of those cans in which there was noted a leakage, the portion in the neighborhood of the covered joint of the can was microscopically examined after opening the can. Those in which perforations were observed were designated as perforated cans, and the ratio of the number of perforated cans to the total number of cans tested was used to show this condition. Further, the portion in the neighborhood of the covered joint portion of the can was microscopically examined after opening the can to check the condition of corrosion. The number of cans used in each of the foregoing tests was about 100 cans, and the state of corrosion was examined by checking 50 cans chosen at random.

5. Delamination (separation of layers)

After storing the canned goods for one year, the delamination that took place between the several layers of the laminated sheets used for covering the inner surface of the cans was examined, and those in which delamination was noted were designated as such.

EXAMPLE 1

One side of four classes of aluminum foil of different thickness shown in Table 1 was heat-fused with a 20 μm-thick film of a polybutylene terephthalate (PET)-/polybutylene isophthalate (PBI) copolymer (PBT/PBI=6/4, hereinafter referred to as copolymer I), and the other side of these foils was also heat-fused with a 20 μm-thick film of the same copolymer, thereby obtaining the specimens 1-4. On the other hand, there was formed on one side of a 20 μm-thick film of copolymer I an evaporation deposited film of aluminum by the high frequency ion-plating method, and atop this evaporation deposited film there was heat-fused a 20 μm-thick film of copolymer I using a hot roll to obtain the specimens 5-7. Specimens 5-7 are those having different thickness of aluminum film as a result of having varied the evaporation deposition time. The thickness of the evaporation deposited film, which was obtained by the weight method, is shown in Table 1. The comparative specimen 1 not containing a metallic foil layer was obtained by heat-fusing two sheets of a 20 μm-thick film of copolymer I. A portion of each of these laminated sheets was cut out and measured for its oxygen permeability, and the results obtained are shown in Table 1.

Next, the foregoing eight classes of laminated sheets were slit into 8-mm-wide strips and heat-fused to the joint portion of the inner side of welded cans heated to about 250° C. by the high frequency induction heating method by pressing with a rubber roll. The metallic surface at the ends of the laminated sheets is protected by being covered with the molten resin according to this heat-fusion method. In this experiment the laminated sheet was set in such a manner that the surface of the film of copolymer I that was heat-fused last in the process of manufacturing the laminated sheet would become heat-fused to the joint portion of the cans.

These specimen cans were packed with the contents shown in Table 1 and submitted to the preservation test. The results obtained are shown in Table 1.

EXAMPLE 2

The specimens 8-12 and comparative specimen 2 were prepared in the following manner.

The laminated sheets of specimens 8 and 9 were obtained by heat-fusing a 30 μm-thick film of copolymer I to both sides of a 9 μm-thick tin foil by the method shown in Example 1 and similarly to both sides of a 9 μm-thick steel foil that had been electrolytically chromated (TFS foil). The laminated sheet of specimen 10 was obtained by adhesion of a 30 μm-thick film of copolymer I to both sides of a stainless steel foil using a urethane type adhesive. Specimens 11 and 12 were obtained by evaporation depositing copper and chromium to a thickness of 2 μm to one side of a 30 μm-thick film of copolymer I followed by the adhesion of 30 μm-thick film of a copolymer I to the evaporation deposited metallic surfaces using a urethane type adhesive. Comparative specimen 2 was obtained by adhering two sheets of a 30 μm-thick film of copolymer I with a urethane type adhesive.

These laminated sheets were slit into 8-mm-wide strips and heat-fused to the joint portion of the inner surface of welded cans by the method described in Example 1. These cans were packed with tomato juice and a 50% apple beverage and submitted to the preservation test. The results obtained are shown in Table 2. As is apparent from Table 2, abnormalities such as perforations, evolution of hydrogen, elution of iron and corrosion were not observed when the laminated sheets including metallic foil were used, whereas corrosion proceeds to such an extent in the case of the comparative specimen 2, not including a metallic foil, to make it unfit for canning of such contents as indicated hereinabove.

EXAMPLE 3

Four classes of laminated sheets, specimens 13, 14, 15, and 16, having the makeups shown in Table 3 were prepared in accordance with the methods described in Examples 1 and 2. Specimen 15 was however prepared in the following manner. First, one side of an aluminum foil was roll coated with an epoxy-phenol type resin coating material (epoxy:phenol=50:50) followed by heat-curing the coating in a hot air oven at 200° C. for 10 minutes to form a film coating having a thickness of 15 μm. The other side of the aluminum foil was then heat-fused with a 30 μm-thick film of the blend shown in Table 3 as the adhesive layer thereby obtaining a three-layered composite film having aluminum as its intermediate layer. These laminated sheets were slit into 8-mm-wide strips, and the test can bodies were prepared by heat-fusing these strips at the joint portion of the inner surface of the cans. After the cans were manufactured, they were packed with mackerel in tomato and a 50% apple beverage and submitted to the preservation test. The results obtained are shown in Table 4. As is apparent from Table 4, superior results were demonstrated in the case where the laminated sheets including a metallic foil were used regardless of the thicknesses of the inner and outer surface films and their class.

EXAMPLE 4

Aluminum was evaporation deposited on a 7 μm-thick film of copolymer I to a thickness of 0.5 μm, after which a solution of copolymer I obtained by heat-dissolving the copolymer in benzyl alcohol was applied to the evaporation deposited surface with a bar coater followed by evaporating the solvent off in a vacuum oven and thereafter passing the film through a 230° C. hot roll to form a 2 μm-thick film of copolymer I on the evaporation deposited surface. The overall thickness of this laminated sheet was 9 μm. This laminated sheet was slit into 8-mm-wide strips and heat-fused to the joint portion of the inner surface of cans. In this case, that in which the 7 μm-thick film side becomes the adhesive layer was designated as specimen 17, while that in which the 2 μm-thick film side becomes the adhesive layer was designated as specimen 18. Using these can bodies, tomato sauce and a 50% apple beverage were packed and submitted to the preservation test. The results of the test are shown in Table 5. As is apparent from these results, no defects were observed in either instance that would make these cans unfit for packing of such contents as shown hereinabove. Again, leakage and delamination were also not observed.

EXAMPLE 5

An aluminum foil of a thickness of 9 μm was used, and the following specimens were prepared. A laminated sheet obtained by heat-fusing a 30 μm-thick film of copolymer I to one side of the aluminum foil (specimen 19); a laminated sheet obtained by heat-fusing to one side of the aluminum foil a 25 μm-thick film of maleic anhydride-modified polypropylene (specimen 20); a laminated sheet obtained by heat-fusing to one side of the aluminum foil a 25 μm-thick film of a resinous blend of maleic anhydride-modified polypropylene and ethylene-vinyl alcohol copolymer blended in a ratio of 90:10 (specimen 21); and a three-layered sheet obtained by heat-fusing a 10 μm-thick maleic anhydride-modified polypropylene film to the aluminum foil side of the specimen 20 laminated sheet (specimen 22). These laminated sheets in 8-mm-wide strips were heat-fused to the outer side joint portions of can bodies to whose inner side joint portions the specimen 4 laminated sheet had been heat-fused. In this experiment, the strip of laminated sheet was set in such manner that the surface of the film that had been first fused to the aluminum foil would be fused to the can. The heat-fusion conditions were the same as those of Example 1, and two classes of can bodies were used, one being that of tin-free steel and the other being that of tinplate. Using these can bodies, the cans were packed with two classes of contents, by submitting the packed can to retort treatment after vacuum seaming or by hot-filling. One hundred cans were prepared in each case. After storing these canned goods for six months at 30° C. in an atmosphere of 75% relative humidity, the joint portion at the outer side of the cans was examined. No rusting, delamination or any other defects were noted in any of the cases where the laminated sheets obtained hereinabove were used.

TABLE 1-a

| Specimen | Thickness of aluminum foil (μm) | Leakage (%) | Perforated cans (%) |
| --- | --- | --- | --- |
| 1 | 150 | 3.0 | 0 |
| 2 | 100 | 0 | 0 |
| 3 | 50 | 0 | 0 |
| 4 | 9 | 0 | 0 |
| 5 | 2 | 0 | 0 |
| 6 | 0.1 | 0 | 0 |
| 7 | 0.01 | 0 | 1.0 |
| Comparative specimen 1 | 0 | 0 | 8.0 |

TABLE 1-b

Results when packed with boiled salmon

| | Tin can | | TFS can | |
|---|---|---|---|---|
| Specimen | Amount of hydrogen evolved (ml) | State of corrosion | Amount of hydrogen evolved (ml) | State of corrosion |
| 1 | 0.14 | No abnormality | 0.06 | No abnormality |
| 2 | 0.10 | No abnormality | 0.02 | No abnormality |
| 3 | 0.08 | No abnormality | 0.03 | No abnormality |
| 4 | 0.05 | No abnormality | 0.02 | No abnormality |
| 5 | 0.07 | No abnormality | 0.02 | No abnormality |
| 6 | 0.07 | No abnormality | 0.03 | No abnormality |
| 7 | 0.10 | Few spots of iron sulfide | 0.08 | Few spots of iron sulfide |
| Comparative specimen 1 | 0.38 | Iron sulfide over whole surface | 0.22 | Iron sulfide over whole surface |

TABLE 1-c

Results when packed with 50% apple beverage

| | Tin can | | | TFS can | | |
|---|---|---|---|---|---|---|
| Specimen | Amount of hydrogen evolved (ml) | Iron eluted (ppm) | State of corrosion | Amount of hydrogen evolved (ml) | Iron eluted (ppm) | State of corrosion |
| 1 | 1.40 | 7.60 | No abnormality | 0.54 | 1.1 | No abnormality |
| 2 | 0.90 | 6.8 | No abnormality | 0.12 | 1.0 | No abnormality |
| 3 | 0.52 | 4.4 | No abnormality | 0.08 | 0.7 | No abnormality |
| 4 | 0.56 | 4.2 | No abnormality | 0.07 | 0.6 | No abnormality |
| 5 | 0.59 | 5.0 | No abnormality | 0.12 | 0.8 | No abnormality |
| 6 | 0.74 | 6.5 | No abnormality | 0.10 | 0.8 | No abnormality |
| 7 | 2.40 | 19.8 | No abnormality | 0.18 | 1.5 | No abnormality |
| Comparative specimen 1 | 9.07 | 75.3 | Numerous rust spots | 5.73 | 37.2 | Whole surface rusty |

TABLE 2-a

| Specimen | Leakage (%) | Perforated cans (%) |
|---|---|---|
| 8 | 0 | 0 |
| 9 | 0 | 0 |
| 10 | 0 | 0 |
| 11 | 0 | 0 |
| 12 | 0 | 0 |
| Comparative specimen 2 | 0 | 7.0 |

TABLE 2-b

Results when packed with tomato sauce

| | Tin can | | TFS can | |
|---|---|---|---|---|
| Specimen | Amount of hydrogen evolved (ml) | State of corrosion | Amount of hydrogen evolved (ml) | State of corrosion |
| 8 | 0.33 | No abnormality | 0.10 | No abnormality |
| 9 | 0.20 | No abnormality | 0.05 | No abnormality |
| 10 | 0.25 | No abnormality | 0.08 | No abnormality |
| 11 | 0.51 | No abnormality | 0.11 | No abnormality |
| 12 | 0.28 | No abnormality | 0.09 | No abnormality |
| Comparative specimen 2 | Swelled can | Whole surface rusty | Swelled can | Whole surface rusty |

TABLE 2-c

Results when packed with 50% apple beverage

| | Tin can | | | TFS can | | |
|---|---|---|---|---|---|---|
| Specimen | Amount of hydrogen evolved (ml) | Iron eluted (ppm) | State of corrosion | Amount of hydrogen evolved (ml) | Iron eluted (ppm) | State of corrosion |
| 8 | 0.40 | 4.4 | No abnormality | 0.06 | 0.5 | No abnormality |
| 9 | 0.52 | 4.7 | No abnormality | 0.06 | 0.6 | No abnormality |
| 10 | 0.63 | 5.1 | No abnormality | 0.06 | 0.6 | No abnormality |
| 11 | 1.08 | 10.5 | No abnormality | 0.07 | 0.8 | No abnormality |
| 12 | 0.87 | 7.3 | No abnormality | 0.05 | 0.8 | No abnormality |
| Comparative specimen 2 | 6.00 | 53.2 | Numerous rusty | 5.20 | 40.6 | Numerous rusty |

TABLE 2-c-continued

| | Results when packed with 50% apple beverage | | | | | |
|---|---|---|---|---|---|---|
| | Tin can | | | TFS can | | |
| Specimen | Amount of hydrogen evolved (ml) | Iron eluted (ppm) | State of corrosion | Amount of hydrogen evolved (ml) | Iron eluted (ppm) | State of corrosion |
| | | | spots | | | spots |

TABLE 3

| Specimen | Adhesive layer | Interface | Metallic layer | Interface | Outer surface layer |
|---|---|---|---|---|---|
| 13 | 20 μm-thick film of nylon 12 | Adhered with urethane type adhesive | 9-μm-thick aluminum foil | Heat-fused | 30 μm-thick film of copolymer I |
| 14 | 20 μm-thick film of maleic anhydride-modified polypropylene | Heat-fused | 9-μm-thick aluminum foil | Heat-fused | 20 μm-thick film of a 1:1 blended resin of copolymer I and polyethylene terephthalate |
| 15 | 30 μm-thick film of a 9:1 blended resin of copolymer I and an ionomer containing sodium ions | Heat-fused | 9-μm-thick aluminum foil | | epoxy-phenol type resin (15 μ) |
| 16 | 30 μm-thick film of copolymer I | Heat-fused | 9-μm-thick aluminum foil | Adhered with urethane type adhesive | 15 μm-thick film of biaxially drawn polyethylene terephthalate |

TABLE 4

Results of preservation test

| | | Mackerel in tomato | | | | 50% Apple beverage | | | | | |
|---|---|---|---|---|---|---|---|---|---|---|---|
| | | Tin can | | TFS can | | Tin can | | | TFS can | | |
| Specimen | Perforated cans (%) | Amount of hydrogen evolved (ml) | State of corrosion | Amount of hydrogen evolved (ml) | State of corrosion | Amount of hydrogen evolved (ml) | Iron eluted (%) | State of corrosion | Amount of hydrogen evolved (ml) | Iron eluted (%) | State of corrosion |
| 13 | 0 | 0.21 | No abnormality | 0.07 | No abnormality | 0.62 | 4.9 | No abnormality | 0.14 | 1.0 | No abnormality |
| 14 | 0 | 0.18 | No abnormality | 0.09 | No abnormality | 0.60 | 5.3 | No abnormality | 0.09 | 0.8 | No abnormality |
| 15 | 0 | 0.19 | No abnormality | 0.08 | No abnormality | 0.41 | 3.6 | No abnormality | 0.09 | 0.7 | No abnormality |
| 16 | 0 | 0.15 | No abnormality | 0.08 | No abnormality | 0.53 | 4.4 | No abnormality | 0.16 | 1.1 | No abnormality |

TABLE 5

Results of preservation test

| | | Tomato sauce | | | | 50% Apple beverage | | | | | |
|---|---|---|---|---|---|---|---|---|---|---|---|
| | | Tin can | | TFS can | | Tin can | | | TFS can | | |
| Specimen | Perforated cans (%) | Amount of hydrogen evolved (ml) | State of corrosion | Amount of hydrogen evolved (ml) | State of corrosion | Amount of hydrogen evolved (ml) | Iron eluted (%) | State of corrosion | Amount of hydrogen evolved (ml) | Iron eluted (%) | State of corrosion |
| 17 | 0 | 0.26 | No abnormality | 0.13 | No abnormality | 0.50 | 6.1 | No abnormality | 0.04 | 0.5 | No abnormality |
| 18 | 0 | 0.43 | No abnormality | 0.05 | No abnormality | 0.33 | 3.9 | No abnormality | 0.07 | 0.9 | No abnormality |

We claim:

1. In a welded metallic can having a can body and a joint portion, wherein the interior of the can body is covered at its joint portion with a film of an organic polymeric resin, the improvement wherein said film is a multilayered film having at least two layers of a film of an organic polymeric resin and one layer selected from the group consisting of a metallic foil, an evaporation coated metallic layer and an electroplated metallic layer, the layer adjacent the welded can being one of said layers of a film of an organic polymeric resin, and the layer most spaced away from the welded can being another layer of a film of an organic polymeric resin.

2. A welded metallic can of claim 1 wherein the layer of an organic polymeric resin film adjacent the welded can is a layer formed by application to the joint portion of the welded can of a film of an organic polymeric resin that has been formed in advance.

3. A welded metallic can of claim 1 wherein the layer of an organic polymeric resin film adjacent the welded can is a layer formed by coating the joint portion of the welded can with a solution or dispersion of said resin.

* * * * *